(12) United States Patent
Zhao

(10) Patent No.: US 12,305,798 B1
(45) Date of Patent: May 20, 2025

(54) MULTIFUNCTIONAL GUITAR STAND

(71) Applicant: Maolin Zhao, Shenzhen (CN)

(72) Inventor: Maolin Zhao, Shenzhen (CN)

( * ) Notice: Subject to any disclaimer, the term of this patent is extended or adjusted under 35 U.S.C. 154(b) by 0 days.

(21) Appl. No.: 18/415,060

(22) Filed: Jan. 17, 2024

(30) Foreign Application Priority Data

Nov. 10, 2023 (CN) .......................... 202311505395.6

(51) Int. Cl.
*F16M 11/38* (2006.01)
*G10G 5/00* (2006.01)

(52) U.S. Cl.
CPC ............... *F16M 11/38* (2013.01); *G10G 5/00* (2013.01); *F16M 2200/06* (2013.01)

(58) Field of Classification Search
CPC ...... F16M 11/38; F16M 2200/06; G10G 5/00; A47C 16/00; A47C 16/02; A47C 16/025
See application file for complete search history.

(56) References Cited

U.S. PATENT DOCUMENTS

| | | | | |
|---|---|---|---|---|
| 329,218 A * | 10/1885 | Rittmann | ................ | E06C 1/005 182/28 |
| 362,589 A * | 5/1887 | Shinn | .................. | A47B 17/036 312/289 |
| 1,359,527 A * | 11/1920 | Reed | ....................... | D06F 81/04 108/6 |
| 1,982,205 A * | 11/1934 | Doman | .................... | D06F 81/04 108/118 |
| 2,607,646 A * | 8/1952 | Westeamp | ............. | A47B 27/02 108/1 |
| 2,741,868 A * | 4/1956 | Saunders | ............... | A47B 19/06 108/62 |
| 3,247,811 A * | 4/1966 | Bauder | ................... | A47B 13/02 108/115 |
| 4,117,781 A * | 10/1978 | Middleton | ............. | A47B 23/00 108/19 |
| 4,296,694 A * | 10/1981 | Kobayashi | ............... | G10G 7/00 984/258 |
| 4,714,224 A * | 12/1987 | Calmes | .................. | A47B 97/08 108/118 |
| 4,880,194 A * | 11/1989 | Geise | .................. | B05B 13/0285 248/176.1 |
| 5,417,168 A * | 5/1995 | Soper | .................... | A47B 3/0918 108/6 |
| 6,575,103 B1 * | 6/2003 | Holdredge | ............... | A47B 3/02 108/118 |
| 6,941,876 B1 * | 9/2005 | Traino | ................... | A47B 23/04 108/50.11 |
| 8,069,795 B1 * | 12/2011 | Williams | ................. | A47B 7/02 108/115 |
| 11,130,512 B1 * | 9/2021 | Mayo, IV | ................. | B62B 3/02 |
| 12,020,670 B2 * | 6/2024 | Lucksom | ................. | G10G 5/00 |

* cited by examiner

*Primary Examiner* — Ko H Chan
(74) *Attorney, Agent, or Firm* — Bay State IP, LLC

(57) ABSTRACT

A multifunctional guitar stand is disclosed which includes a guitar stand with two large supporting arms, two small supporting arms, a rotary stopper, a plurality of footstool grooves, a stand groove, a first crossbar, a second crossbar, a third crossbar, a fourth crossbar, and a central bolt, disposed between the large supporting arms and the small supporting arms.

4 Claims, 7 Drawing Sheets

MULTIFUNCTIONAL GUITAR STAND

CROSS REFERENCE TO RELATED APPLICATION

This application claims the benefit of and takes priority from Chinese Patent Application No. 202311505395.6 filed on Nov. 10, 2023, the contents of which are herein incorporated by reference.

TECHNICAL FIELD

The present application relates to the technical field of musical instrument-related accessories, and more particularly to a multifunctional guitar stand.

BACKGROUND

During the use of a plucked string musical instrument such as a guitar, it is usually necessary to place the plucked string musical instrument on a stand. Also, during the playing of a musical instrument such as a guitar, it is necessary for a player to place his/her foot on a footstool to obtain an improved comfort of playing. A guitar stand and a guitar footstool are common accessories used in guitar playing. The existing guitar stand and footstool both have a single function, and cannot fulfill the functions both as a guitar stand and a guitar footstool. Furthermore, the existing guitar stand and guitar footstool are not easy to be stored and carried. To solve the problems described above, the present application proposes a new guitar stand used for placing a guitar and used as a footstool for guitar playing, which may be folded storage and is easy to carry.

SUMMARY

A multifunctional guitar stand (hereinafter referred to as a guitar stand) is disclosed in the present utility model to solve the problems in the prior art that the guitar stand and the guitar footstool both have only a single function and have a large volume which is not easy to be stored and carried. Accordingly, a technical proposal is proposed in the present utility model as follows:
a guitar stand comprising:
two large supporting arms, symmetrically disposed at an angle and having an end in contact with the ground for supporting the whole;
two small supporting arms, symmetrically disposed on the inner side of the two large supporting arms, crossed with the large supporting arms for supporting the whole, and having an end in contact with the ground;
a rotary stopper, connected to the inner side of an end of each of the two small supporting arms, and allowed to be rotated with a crossbar connected to the end of each of the small supporting arms as the center of rotation;
a plurality of footstool grooves, disposed in a surface of the rotary stopper, allowing the guitar stand to be held in position in the case of the execution of the use of the guitar stand as a footstool;
a stand groove, disposed at an end of the rotary stopper, allowing the guitar stand to be held in position in the case of the execution of the use of the guitar stand as a guitar stand;
a first crossbar, configured for fixedly connecting to the inner side of an end of each of the two large supporting arms disposed near the ground to fix the connection of the two large supporting arms, allowed to be caught by the stand groove of the rotary stopper to hold the rotary stopper in position, resulting in the use of the guitar stand as a guitar stand and the support for the back surface of the guitar;
a second crossbar, configured for connecting the inner side of an end of each of the two large supporting arms disposed away from the ground to fix the connection of the two large supporting arms, allowed to be caught by one of the plurality of footstool grooves of the rotary stopper to hold the rotary stopper in position, resulting in the use of the guitar stand as a guitar footstool;
a third crossbar, fixedly connected to the inner side of an end of each of the two small supporting arms disposed near the ground to fix the connection of the two small supporting arms;
a fourth crossbar, fixedly connected to the inner side of an end of each of the two small supporting arms disposed away from the ground to fix the connection of the two small supporting arms, and allowed to combine the rotatory stopper and the small supporting arms together by passing through a stopper rotation hole of the rotatory stopper, and allowed to be the center of rotation for rotation of the rotatory stopper; and
a central bolt, disposed between the large supporting arms and the small supporting arms to combine the large supporting arms and the small supporting arms, and allowed to be the center of rotation for rotation of the large supporting arms and the small supporting arms.

REFERENCE SIGNS

Figure 1:
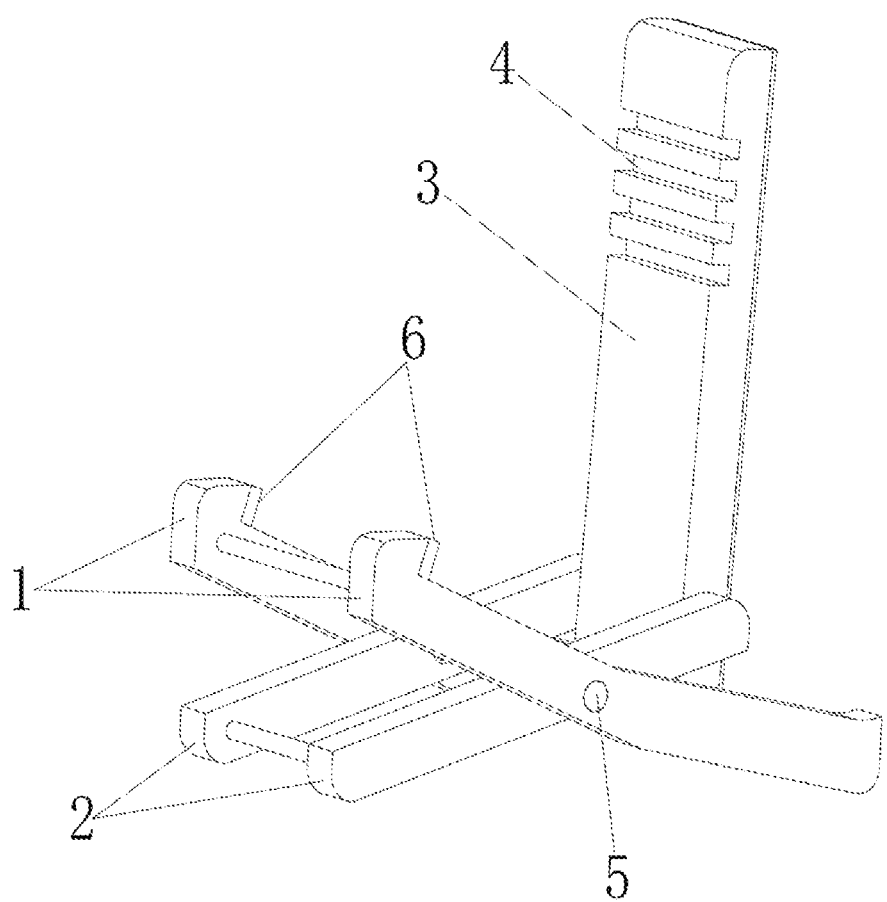
FIG. 1 and FIG. 2 are perspective views of the overall structure of a multifunctional guitar stand according to the present utility model.
Figure 2:
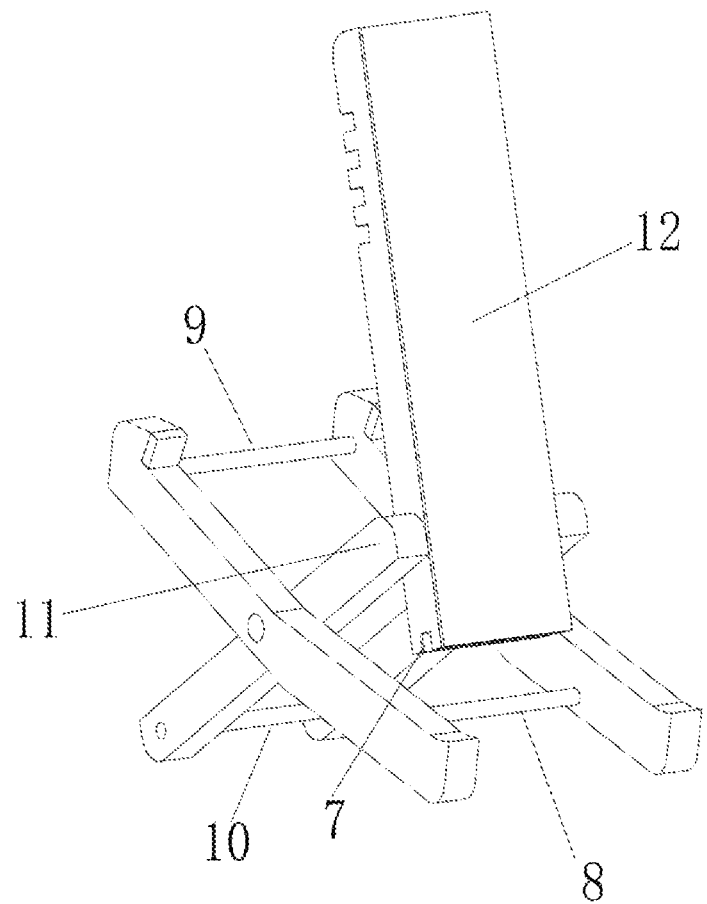
Figure 3:
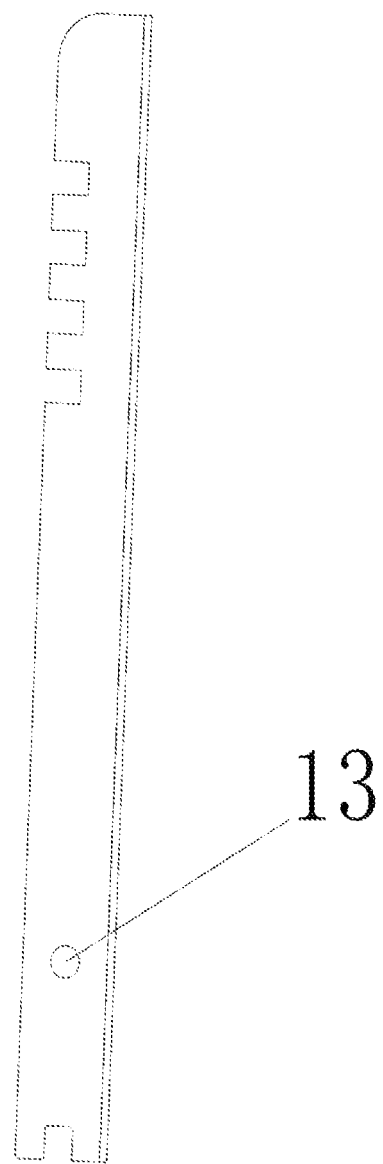
FIG. 3 shows an independent side view of a rotary stopper of a multifunctional guitar stand according to the present utility model.
Figure 4:
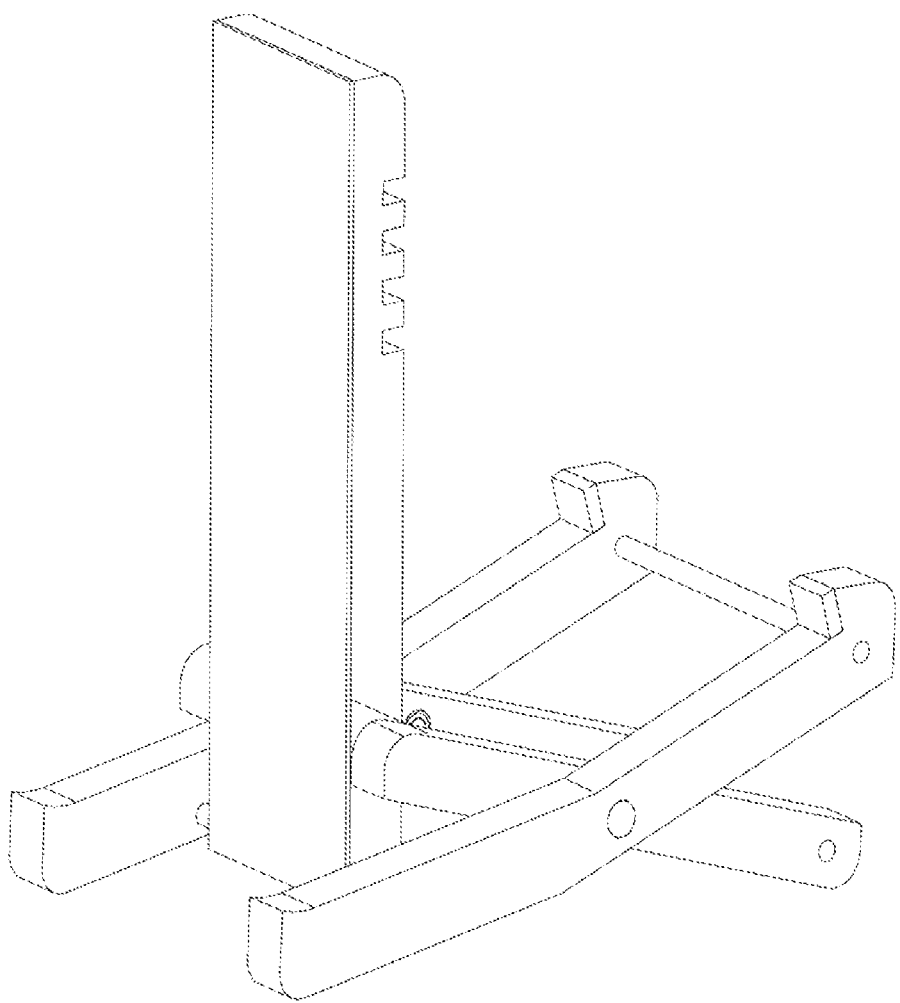
FIG. 4 shows a perspective view of a multifunctional guitar stand according to the present utility model when used as a stand.
Figure 5:
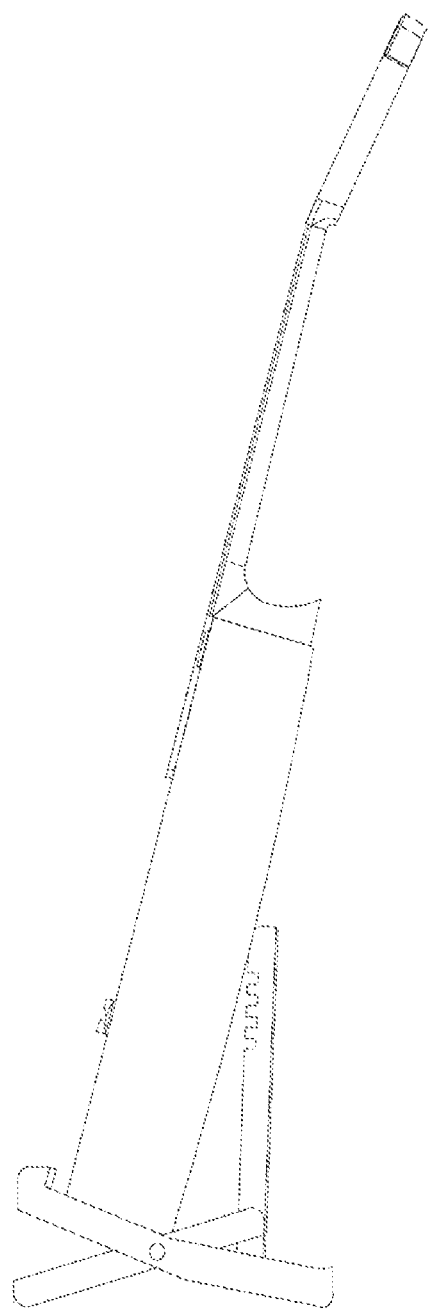
FIG. 5 shows a schematic diagram of the function of a multifunctional guitar stand according to the present invention as a stand.

1—large supporting arm; 2—small supporting arm; 3—rotary stopper; 4—footstool groove; 5—central bolt; 6—guitar protective rubber gasket; 7—stand groove; 8—first crossbar; 9—second crossbar; 10—third crossbar; 11—fourth crossbar; 12—footstool anti-sliding pad; 13—stopper rotation hole

DETAILED DESCRIPTION

The present utility model is described in detail in conjunction with the accompanying drawings. The present utility model and the embodiments thereof are described below without limitation, that is, the actual implementations are not limited to this. If one skilled in the art is inspired to design the similar structures and embodiments as those of the present utility model without departing from the purpose of the present utility model and without an inventive step involved, such similar structures and embodiments should be within the scope of the present utility model.

Embodiment 1: as shown in FIGS. 1-5, the large supporting arm 1 and the small supporting arm 2 of a multifunctional guitar stand according to the present utility model are combined by a central bolt 5, and a fourth crossbar 11 passes through a stopper rotation hole 13 of a rotary stopper 3 to combine the rotary stopper 3 and the small supporting arm 2 together. By rotating the large supporting arm 1 and the small supporting arm 2 in an X shape with the central bolt 5 as the center of rotation and making a first crossbar 8 get caught and held by a stand groove 7 disposed at an end of the rotary stopper 3, the large supporting arm 1, the small supporting arm 2, and the rotary stopper 3 may be held in position. At this time, a guitar may be placed on the large supporting arm 1. The back surface of the guitar may rest against the rotary stopper 3. The large supporting arm 1 has an end provided with a protruding portion for blocking the front surface of the guitar to prevent the guitar from tipping over, and the protruding portion is provided with a guitar protective rubber gasket 6 which is used for protecting the guitar from being pressed.

Figure 6:
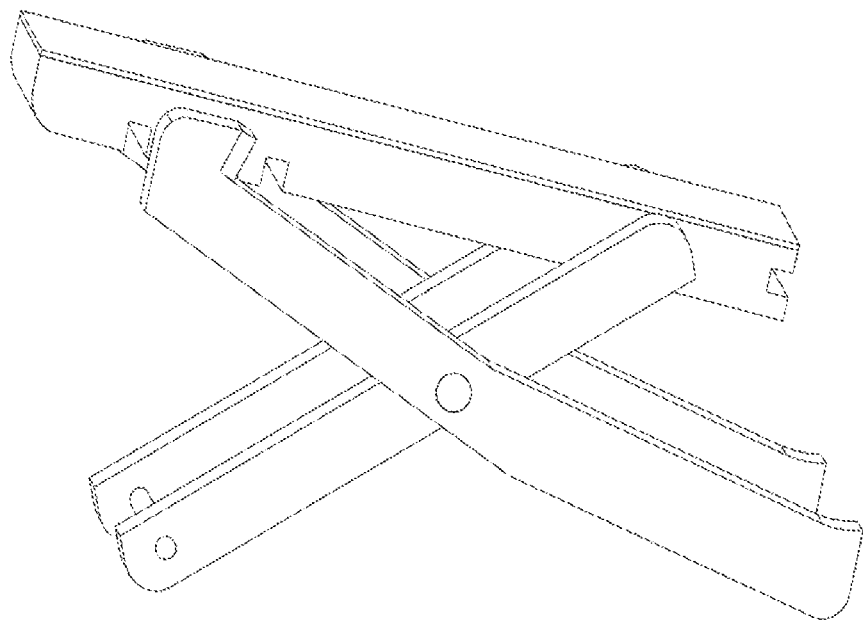
FIG. 6 shows a perspective view of a multifunctional guitar stand according to the present utility model when used as a footstool.

Embodiment 2: as shown in FIG. 6, the large supporting arm 1 and the small supporting arm 2 of the multifunctional guitar stand are combined by the central bolt 5, and the fourth crossbar 11 passes through the stopper rotation hole 13 of the rotary stopper 3 to combine the rotary stopper 3 and the small supporting arm 2 together. By rotating the large supporting arm 1 and the small supporting arm 2 in an X shape with the central bolt 5 as the center of rotation and making the second crossbar 9 get caught by one of a plurality of footstool grooves 4 disposed in a surface of the rotary stopper 3, the large supporting arm 1, the small supporting arm 2, and the rotary stopper plate 3 may be held in position, so that the guitar stand may be used as a guitar footstool. As described above, there is a plurality of footstool grooves 4 disposed in a surface of the rotary stopper 3. The height of the footstool is allowed to be adjusted when the crossbar is caught by one of the plurality of grooves at different positions on the rotary stopper. A footstool anti-sliding pad 12 is provided on a surface of the rotary stopper for increasing the friction force between the sole and the footstool.

Figure 7:
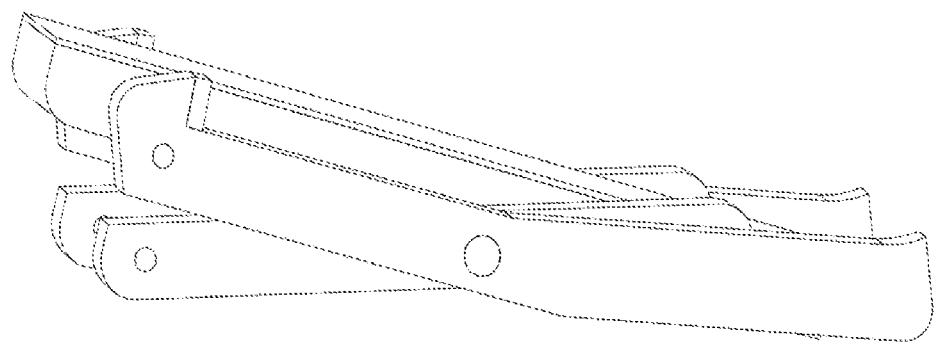
FIG. 7 shows a perspective diagram of a multifunctional guitar stand according to the present utility model in a folded state.

As shown in FIG. 7, the large supporting arm 1 and the small supporting arm 2 of the multifunctional guitar stand are rotated to be flat with the central bolt 5 as the center of rotation, and the rotary stopper 3 is in a flat state, allowing the stand to be folded.

What is claimed is:

1. A multifunctional guitar stand, characterized in that, comprising:

a large supporting arm (1), a small supporting arm (2), a rotary stopper (3), a first crossbar (8), a second crossbar (9), a third crossbar (10), a fourth crossbar (11), and a central bolt (5);

wherein the large supporting arm (1) and the small supporting arm (2) are combined by the central bolt (5), and the large supporting arm (1) and the small supporting arm (2) are allowed to be rotated with the central bolt (5) as the center of rotation; and wherein the rotary stopper (3) has a side provided with a rotary stopper hole (13), a surface provided with a plurality of footstool grooves (4), and an end provided with a stand groove (7) concavely indented in a u-shape within the rotary stopper (3) toward the plurality of footstool grooves (4) and configured to freely receive and release the first crossbar (8); and the rotary stopper (3) is combined with the small supporting arm (2) by passing the fourth crossbar (11) through the rotary stopper hole (13), and the rotary stopper (3) is allowed to be rotated with the fourth crossbar (11) as the center of rotation.

2. The multifunctional guitar stand according to claim 1, characterized in that, the rotary stopper (3) is allowed to be rotated with the fourth crossbar (11) as the center of rotation, and the first crossbar (8) is allowed to be caught by the stand groove (7), resulting in the use of the guitar stand as a guitar stand and the support for the back of the guitar to prevent the guitar from tipping over.

3. The multifunctional guitar stand according to claim 1, characterized in that, the rotary stopper (3) is allowed to be rotated with the fourth crossbar (11) as the center of rotation, and the second crossbar (9) is allowed to be caught by the footstool groove (4), resulting in the use of the guitar stand as a guitar footstool.

4. The multifunctional guitar stand according to claim 1, characterized in that, the plurality of footstool grooves (4) are provided in a surface of the rotary stopper (3), and the height of the footstool is allowed to be changed by allowing the second crossbar (9) to be caught by one of the plurality of footstool grooves (4) at different positions on the rotary stopper.

* * * * *